United States Patent
Kisaichi et al.

(10) Patent No.: US 10,550,755 B2
(45) Date of Patent: Feb. 4, 2020

(54) SADDLE TYPE VEHICLE HAVING WATER COOLED ENGINE

(71) Applicant: HONDA MOTOR CO., LTD., Tokyo (JP)

(72) Inventors: Toru Kisaichi, Wako (JP); Hiroyuki Kaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 15/715,657

(22) Filed: Sep. 26, 2017

(65) Prior Publication Data
US 2018/0087441 A1    Mar. 29, 2018

(30) Foreign Application Priority Data

Sep. 29, 2016   (JP) ................. 2016-192134

(51) Int. Cl.
| | |
|---|---|
| *F01P 7/16* | (2006.01) |
| *F01P 11/04* | (2006.01) |
| *F01P 3/00* | (2006.01) |
| *F01P 7/14* | (2006.01) |

(52) U.S. Cl.
CPC ............ *F01P 7/16* (2013.01); *F01P 11/04* (2013.01); *F01P 2003/001* (2013.01); *F01P 2007/146* (2013.01); *F01P 2050/16* (2013.01)

(58) Field of Classification Search
CPC ........ F01P 7/16; F01P 11/04; F01P 2003/001; F01P 2007/146; F01P 2050/16; F01N 3/30; F01N 2390/06; F01N 2590/04
See application file for complete search history.

(56) References Cited

U.S. PATENT DOCUMENTS

| | | | | |
|---|---|---|---|---|
| 4,300,718 | A  * | 11/1981 | Beyer .................. | F01P 11/0285 123/41.09 |
| 6,679,431 | B1 * | 1/2004  | Mathew ................... | F01P 7/16 137/199 |
| 2002/0023596 | A1 * | 2/2002 | Hirano ...................... | F01P 7/16 123/41.1 |

(Continued)

FOREIGN PATENT DOCUMENTS

| | | |
|---|---|---|
| EP | 1132586 A2 | 9/2001 |
| JP | 3816291 B2 | 8/2006 |
| JP | 2017-125467 A | 7/2017 |

OTHER PUBLICATIONS

Extended European Search Report dated Jan. 4, 2018, for corresponding European Application No. 17193993.7.

*Primary Examiner* — Syed O Hasan
(74) *Attorney, Agent, or Firm* — Birch, Stewart, Kolasch & Birch, LLP

(57) ABSTRACT

To provide a saddle type vehicle with a water cooled engine allowing simplification of the mounting structure for a thermostat and a check valve.

A saddle type vehicle having a water cooled engine, includes: a thermostat provided in a cooling water path of the water cooled engine; and a check valve provided in a secondary air path supplying secondary air to an exhaust path of the water cooled engine, wherein a case of the thermostat and a case of the check valve are formed integrally. The case of the thermostat is formed in a cylindrical configuration, and the case of the check valve is integrally connected to the cylindrical side wall thereof.

3 Claims, 8 Drawing Sheets

(56) References Cited

U.S. PATENT DOCUMENTS

2004/0216726 A1* 11/2004 Hori .................... F01L 1/446
                                                                       123/699
2010/0170456 A1    7/2010 Watanabe et al.
2013/0221116 A1* 8/2013 Tsuchiya .................. F01P 7/14
                                                                       236/34.5

* cited by examiner

SADDLE TYPE VEHICLE HAVING WATER COOLED ENGINE

TECHNICAL FIELD

The present invention relates to a saddle type vehicle having a water cooled engine.

BACKGROUND ART

Conventionally, as a saddle type vehicle having a water cooled engine, there is known, as disclosed, for example, in Patent Document 1, one equipped with a thermostat 94 (FIG. 5) provided in a cooling water path of a water cooled engine 16, and a check valve 82 (FIG. 6) provided in a secondary air path supplying secondary air to an exhaust path of the water cooled engine 16.

PRIOR ART DOCUMENT

Patent Document

[Patent Document 1]
Japanese Patent No. 3816291

SUMMARY OF THE INVENTION

Problem to be Solved by the Invention

In the conventional saddle type vehicle having a water cooled engine, the thermostat 94 and the check valve 82 are formed as separate components, which are respectively and individually mounted to the engine 16, resulting in a rather complicated structure.

It is an object of the present invention to provide a saddle type vehicle with a water cooled engine allowing simplification of the mounting structure of the thermostat provided in the cooling water path of the water cooled engine and that of the check valve provided in the secondary air path supplying secondary air to the exhaust path.

Means for Solving the Problem

To achieve the above object, there is provided, in accordance with the present invention, a saddle type vehicle having a water cooled engine, including: a thermostat provided in a cooling water path of the water cooled engine; and a check valve provided in a secondary air path supplying secondary air to an exhaust path of the water cooled engine, in which a case of the thermostat and a case of the check valve are formed integrally.

In this saddle type vehicle having the water cooled engine, the case of the thermostat and the case of the check valve are formed integrally, so that it is possible to achieve simplification in structure and a reduction in production cost. Further, the mounting structure can be simplified.

In this saddle type vehicle having a water cooled engine, the case of the thermostat is formed in a cylindrical configuration, and the case of the check valve may be integrally connected to the cylindrical side wall thereof.

In this construction, the connection portion (connection area) between the case of the thermostat and the case of the check valve can be reduced in size, so that, even when the check valve attains high temperature, that heat can be prevented from being easily transmitted to the case of the thermostat.

In this saddle type vehicle having the water cooled engine, a through-hole for a fixation bolt may be provided between the case of the thermostat and the case of the check valve, and the thermostat and the check valve may be fixed to the water cooled engine by a bolt extending through this through-hole.

In this construction, the through-hole for the fixation bolt is provided between the case of the thermostat and the case of the check valve, whereby, even when the check valve attains high temperature, that heat can be prevented from being easily transmitted to the case of the thermostat.

In this saddle type vehicle having a water cooled engine, the water cooled engine is equipped with a crankcase arranged below, a cylinder extending upwardly from this crankcase, and an exhaust pipe which is connected to an exhaust outlet provided in front of this cylinder and which extends from the front of the cylinder toward a side of the cylinder so as to be curved as it extends rearwards; and
the thermostat and the check valve may be fixed to the side portion of the cylinder above the crankcase, at the rear of the curved portion of the exhaust pipe, and on the inner side of the exhaust pipe.

In this construction, the thermostat and the check valve can be protected by the crankcase on the lower side, by the curved portion of the exhaust pipe on the front side, and by the exhaust pipe and the cylinder sidewise.

Thus, there is no need to separately provide a protection member, thereby making it possible to achieve a reduction in cost.

MODE FOR CARRYING OUT THE INVENTION

Figure 1:
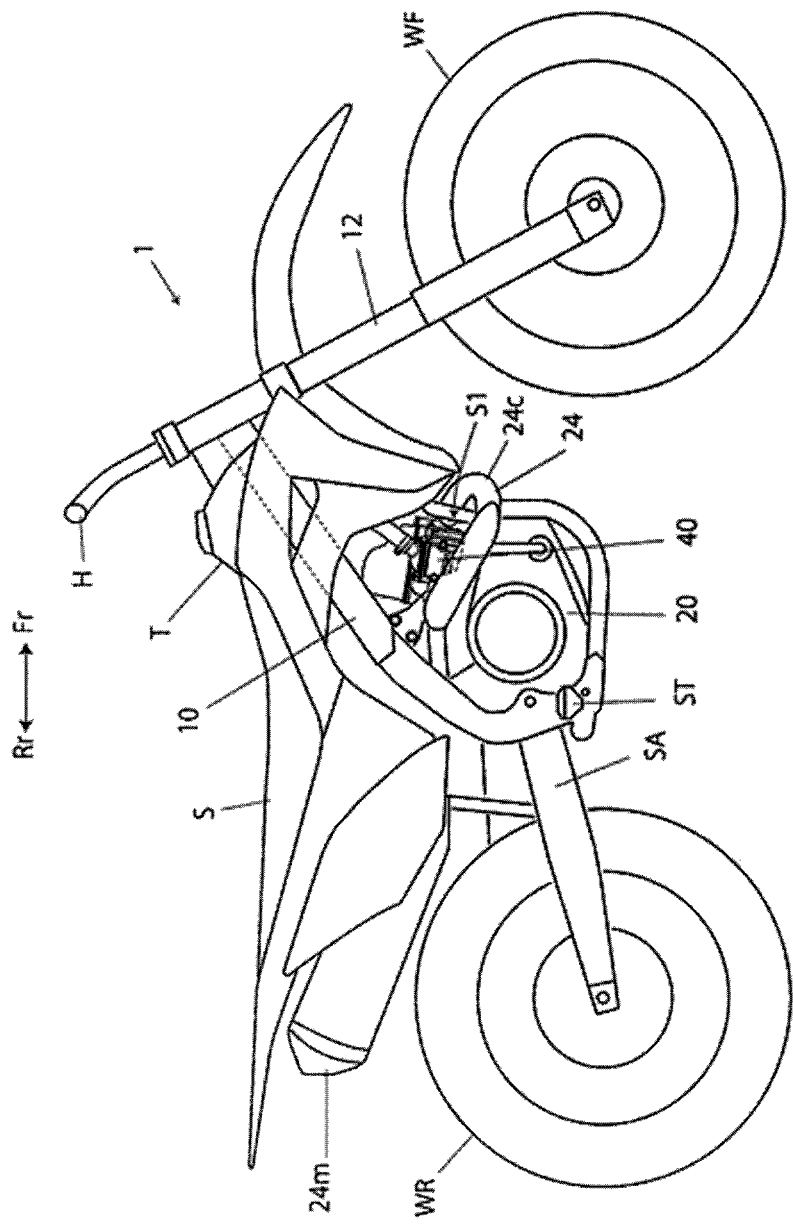
FIG. 1 is a right-hand side view of a saddle type vehicle having a water cooled engine according to an embodiment of the present invention.
Figure 2:
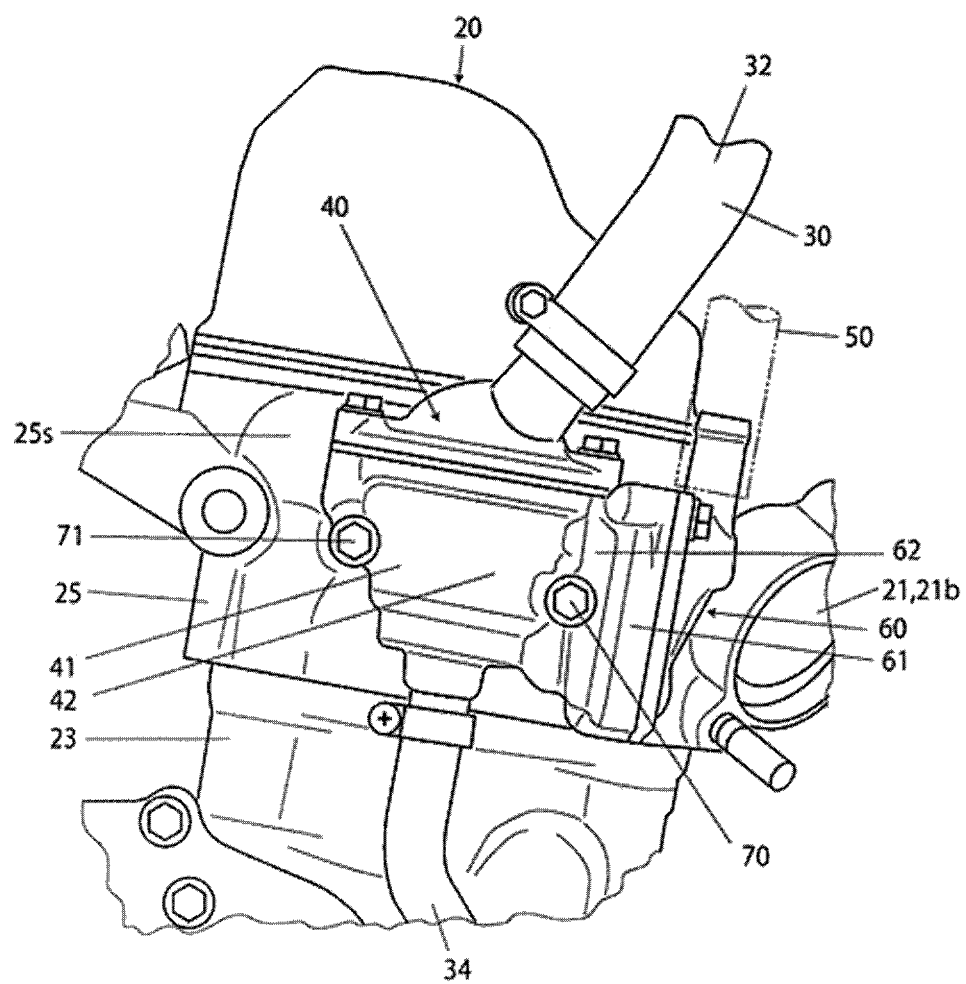
FIG. 2 is a partially omitted enlarged view of FIG. 1.

In the following, a saddle type vehicle having a water cooled engine according to an embodiment of the present invention will be described with reference to the drawings. The drawings should be viewed according to the orientation of the reference symbols. In the following description, the forward and rearward directions, the leftward and rightward directions, and the upward and downward directions are those as viewed from the driver, and, as needed, symbols Fr, Rr, L, R, U, and D respectively standing for the forward, rearward, leftward, rightward, upward, and downward directions of the vehicle are indicated in the drawings. In the drawings, the same or equivalent parts are indicated by the same reference symbols.

In a saddle type vehicle 1 having a water cooled engine depicted in FIG. 1, a front wheel WF is supported by a front fork 12 at the front portion of a vehicle body frame 10 so as to allow steering. At the rear portion of the vehicle body frame 10, a rear wheel WR is supported by a swing arm SA at the rear portion, and a water cooled engine 20 driving the rear wheel WR is mounted to the vehicle body frame 10. Symbol H indicates a handle, symbol T indicates a fuel tank, symbol S indicates a seat on which the driver is seated, and symbol ST indicates a footrest step for the driver.

As depicted in FIGS. 2 through 6, a cooling water path 30 of a water cooled engine 20 is provided with a thermostat 40. Further, a secondary air path 50 for supplying secondary air to an exhaust path 21 of the water cooled engine 20 is provided with a check valve 60.

A case 41 of the thermostat 40 and a case 61 of the check valve 60 are formed integrally.

In this saddle type vehicle 1 having a water cooled engine, the case 41 of the thermostat 40 and the case 61 of the check valve 60 are formed integrally, so that it is possible to simplify the structure of the thermostat 40 and the check valve 60 and to produce them at low cost. Further, the mounting structure for the thermostat 40 and the check valve 60 can also be simplified.

The case 41 of the thermostat 40 and the case 61 of the check valve 60 can be formed integrally of a well-known metal.

The case 41 of the thermostat 40 is formed in a cylindrical configuration, and the case 61 of the check valve 60 is integrally connected to a cylindrical side wall 42 thereof.

Figure 5:
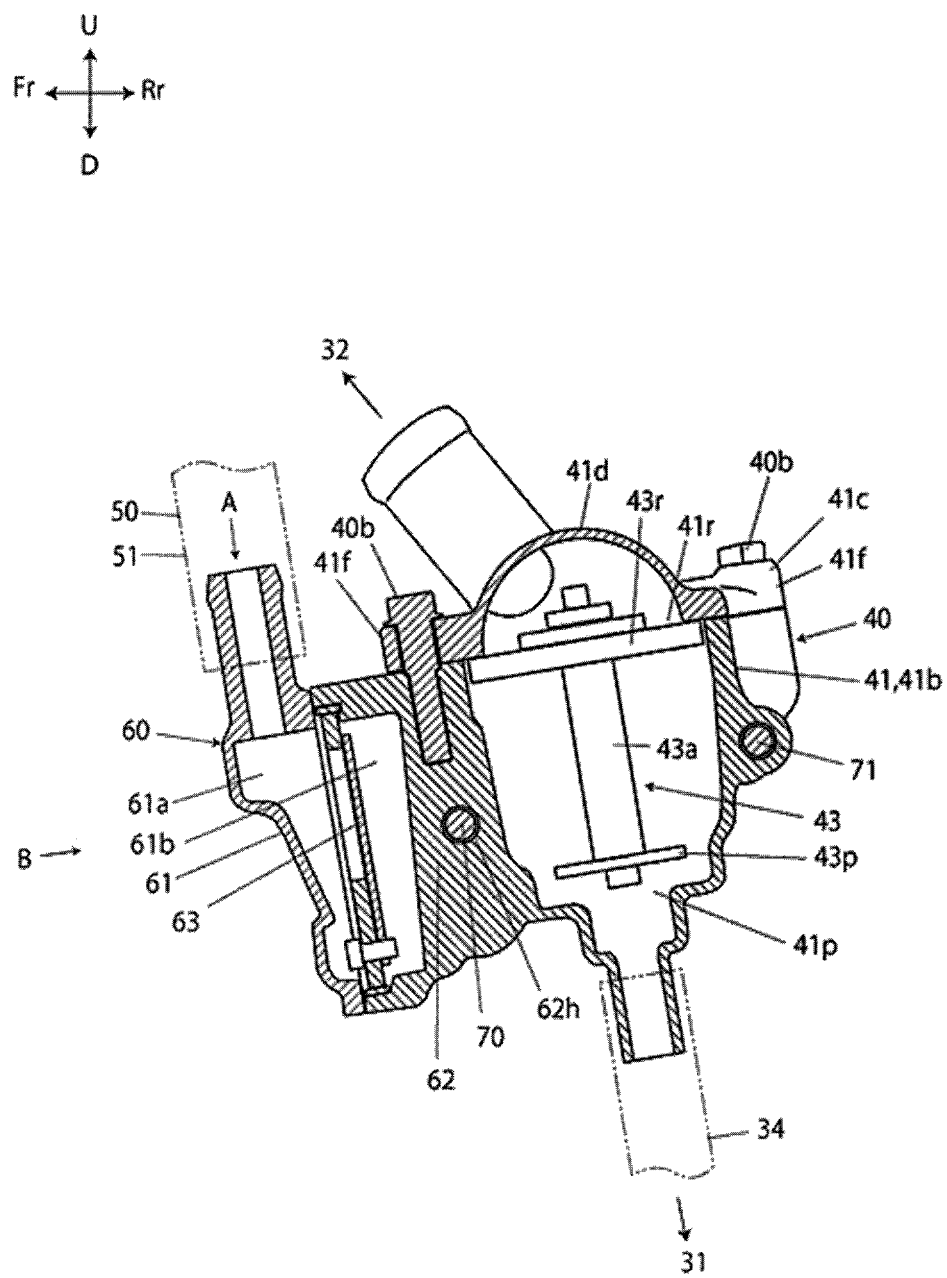
FIG. 5 is a sectional view of a thermostat and a check valve (a partially omitted sectional view taken along line 5-5 of FIG. 3).

In this construction, the connection area of a connection portion 62 between the case 41 of the thermostat 40 and the case 61 of the check valve 60 (the area of the connection portion 62 as seen from the direction of arrow B in FIG. 5) can be reduced, so that even when the check valve 60 attains high temperature, it is possible to prevent the heat from being easily transmitted to the case 41 of the thermostat 40.

Between the case 41 of the thermostat 40 and the case 61 of the check valve 60 (i.e., in the above-mentioned connection portion 62), there is provided a through-hole 62h (see FIG. 5) for a fixation bolt 70, and the thermostat 40 and the check valve 60 are fixed to the water cooled engine 20 by means of the bolt 70 passing through this through-hole 62h.

In this construction, the through-hole 62h for the fixation bolt 70 is provided between the case 41 of the thermostat 40 and the case 61 of the check valve 60, whereby even when the check valve 60 attains high temperature, it is possible to prevent the heat from being easily transmitted to the case 41 of the thermostat 40.

Figure 8:
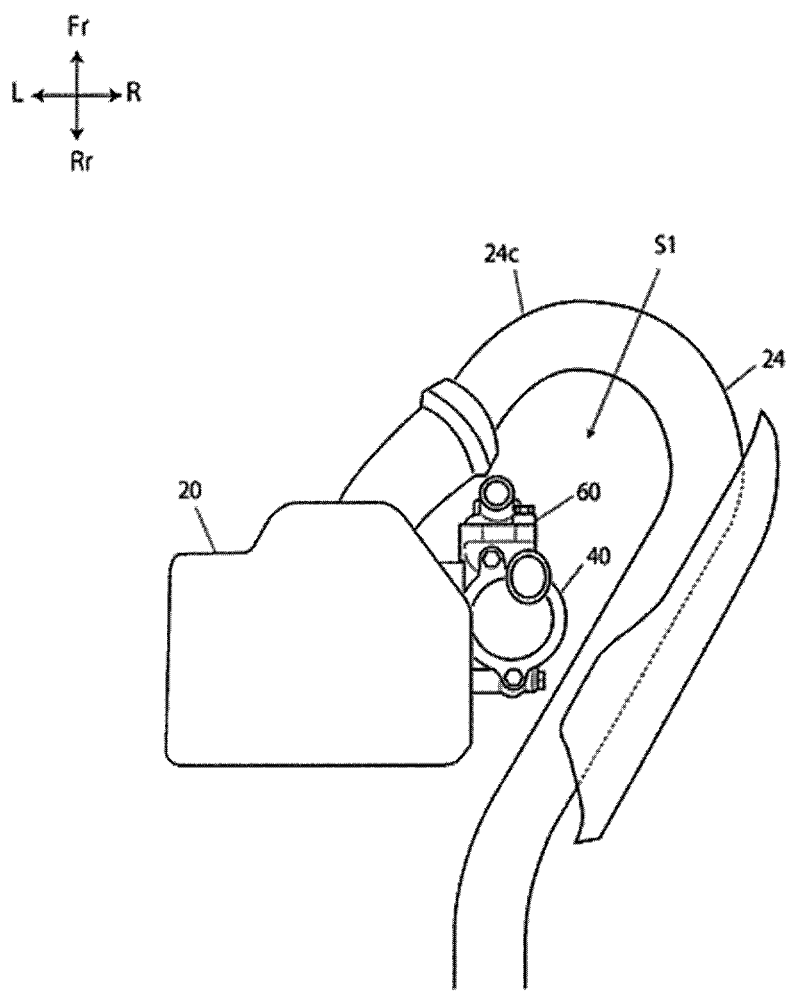
FIG. 8 is a schematic plan view illustrating the arrangement of the engine, the exhaust pipe, the thermostat, and the check valve.

The water cooled engine 20 is equipped with a crankcase 22 arranged below, a cylinder 23 (including a cylinder head 25) extending upwards from the crankcase 22, and an exhaust pipe 24 (FIGS. 1 and 8) which is connected to an exhaust outlet 21b provided to the front of the cylinder 23 and which extends from the front of the cylinder 23 toward a side of the cylinder 23 so as to be curved as it extends rearwards.

The thermostat 40 and the check valve 60 are fixed to a side portion 25s of the cylinder head 25 (FIGS. 2 and 6) above the crankcase 22, at the rear of a curved portion 24c of the exhaust pipe 24, and on the inner side of the exhaust pipe 24.

That is, the thermostat 40 and the check valve 60 are arranged in a space S1 defined above the crankcase 22, at the rear of the curved portion 24c of the exhaust pipe 24, and on the inner side of the exhaust pipe 24 (see FIGS. 1, 3, 6, and 8).

In this construction, the thermostat 40 and the check valve 60 can be protected by the crankcase 22 on the lower side, by the curved portion 24c of the exhaust pipe 24 on the front side, and by the exhaust pipe 24 and the cylinder 23 sideways.

Thus, there is no need to separately provide a protection member for the thermostat 40 and the check valve 60, making it possible to achieve a reduction in cost.

In FIG. 1, reference symbol 24m indicates a muffler provided at the rear portion of the exhaust pipe 24.

Figure 4:
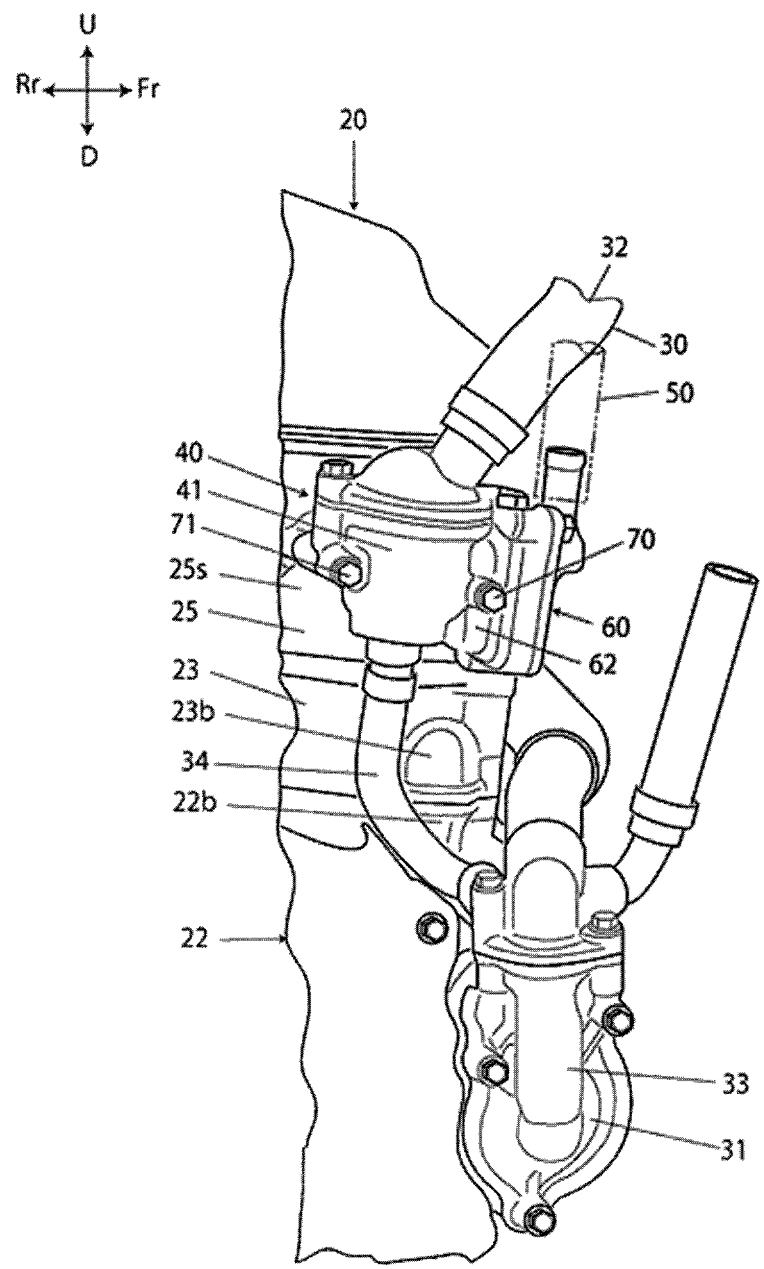
FIG. 4 is a partially omitted perspective view of the water cooled engine and the peripheral portions thereof.

As depicted in FIG. 4, a cooling water path 30 of the water cooled engine 20 is provided with a water pump 31. Through the operation of the water pump 31, the cooling water circulates in the following order:

a water pump 31→a water jacket in the crankcase 22 of the water cooled engine 20 (an outflow path outer wall leading to a water jacket of the cylinder from the above-mentioned water jacket is indicated by reference symbol 22b)→The water jacket of the cylinder 23 of the water cooled engine 20 (an inflow path outer wall to the water jacket is indicated by reference symbol 23b)→a water jacket 25w of the cylinder head 25 (FIG. 6)→an outflow path 25b from the water jacket 25w of the cylinder head 25 (FIGS. 6 and 7)→the thermostat 40→a path 32 leading to a radiator→the radiator (not depicted)→a path 33 leading from the radiator to the water pump 31→the water pump 31.

The basic construction of the thermostat 40 is well-known in the art. As mainly depicted in FIG. 5, it is equipped with the case 41, a case body (thermostat main body) 43 accommodated in this case 41, a radiator side valve port 41r formed in the case 41, and a water pump side valve port 41p.

The valve body 43 is equipped with a shaft portion 43a, a valve portion 43r provided at one end side of this shaft portion 43a and configured to open and close the radiator side valve port 41r, and a valve portion 43p provided at the other end side of the shaft portion 43a and configured to open and close the water pump side valve port 41p.

When the temperature of the cooling water flowing into the case 41 of the thermostat 40 from an outflow path 25b (FIGS. 6 and 7) extending from the water jacket 25w of the above-mentioned cylinder head 25 is a predetermined temperature or more, the valve body 43 moves to the other end side in the axial direction of the shaft portion 43a (i.e., moves downwards as seen in FIG. 5), and the valve portion 43p closes the water pump side valve port 41p. At the same time, the valve portion 43r opens the radiator side valve port 41r, and supplies the cooling water from the engine to the radiator.

Figure 3:
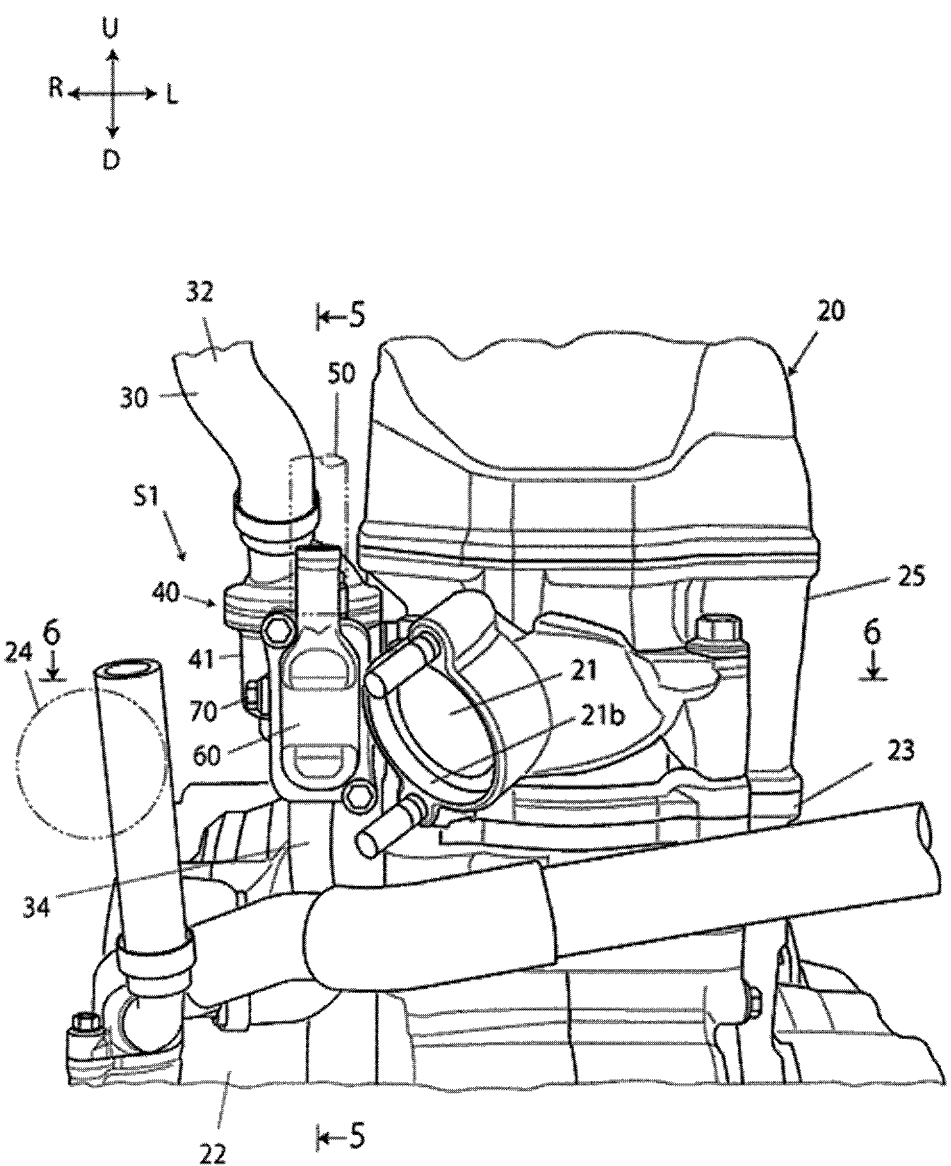
FIG. 3 is a partially omitted enlarged front view of a water cooled engine and peripheral portions thereof.

On the other hand, when the temperature of the cooling water flowing into the case 41 of the thermostat 40 from the outflow path 25b (FIGS. 6 and 7) extending from the water jacket 25w of the cylinder head 25 is less than the predetermined temperature, the valve body 43 moves to one end side in the axial direction of the shaft portion 43a (i.e., moves upwards as seen in FIG. 5), and the valve portion 43r closes the radiator side valve port 41r. At the same time, the valve portion 43p opens the water pump side valve port 41p, and supplies the cooling water from the engine to the water pump 31 through a hose 34 (FIGS. 3 and 4).

As mainly depicted in FIG. 5, the case 41 of the thermostat 40 is equipped with a cylindrical case main body 41b and a cover body 41c having a semi-spherical portion 41d and a flange portion 41f covering the opening of this case main body 41b. Two portions of the flange portion 41f of the cover body 41c are fastened and fixed to the case main body 41b by bolts 40b, whereby the cover body 41c and the case main body 41b are bonded to each other.

Figure 7:
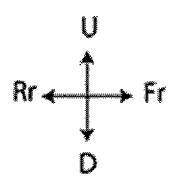
FIG. 7 is a diagram mainly illustrating the right-hand side surface of a cylinder head.
Figure 7:
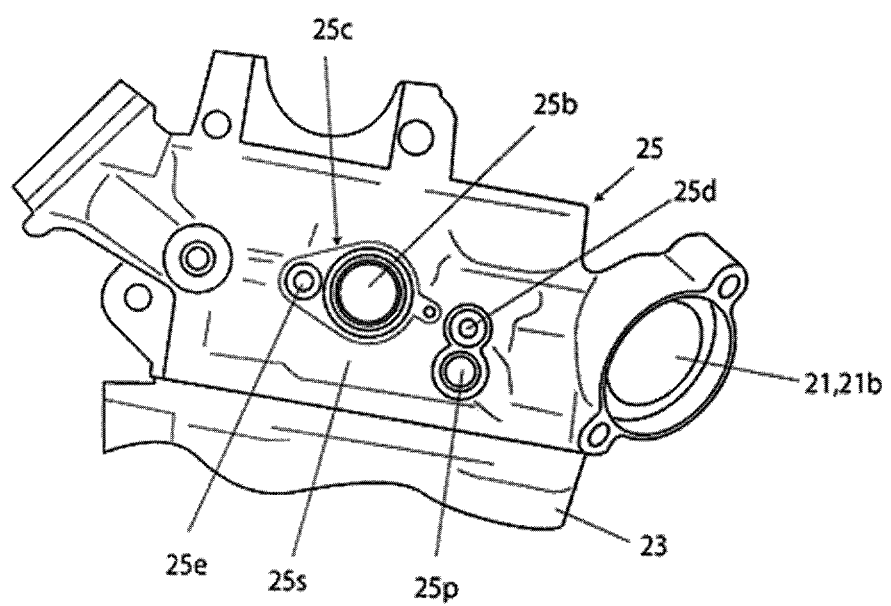

As depicted in FIG. 7, at a side portion of the cylinder head 25, there is provided a connection portion 25c for connecting the thermostat 40 to the outflow path 25b. The case 41 of the thermostat 40 is fastened and fixed to this connection portion 25c by the above-mentioned fixation bolt 70 and another fixation bolt 71, whereby the outflow path 25b from the water jacket 25w communicates with the interior of the case 41 of the thermostat 40.

In FIG. 7, reference symbol 25d indicates a female hole with which the fixation bolt 70 is engaged, and reference symbol 25e indicates a female hole with which the fixation bolt 71 is engaged.

Figure 6:
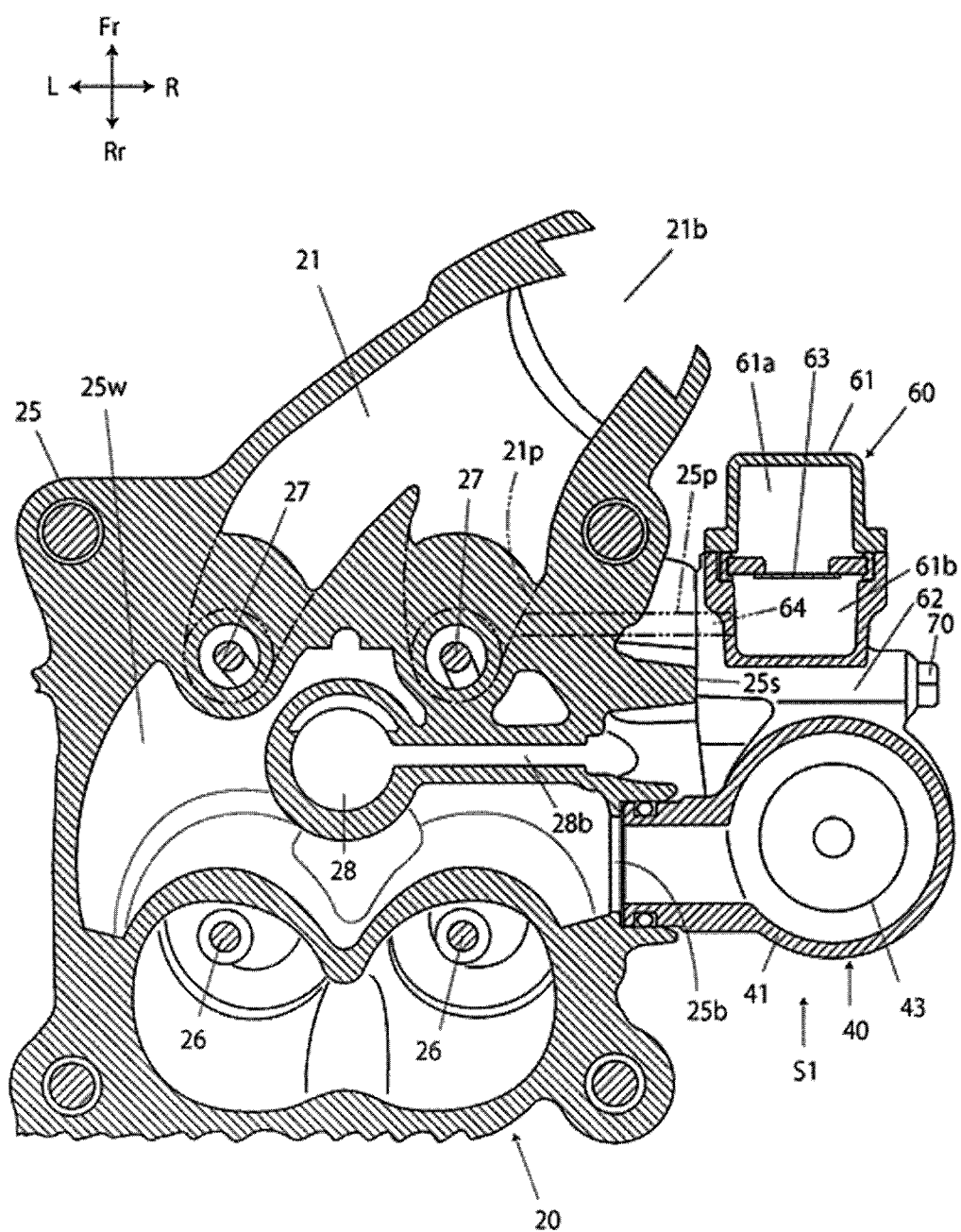
FIG. 6 is a partially omitted sectional view taken along line 6-6 of FIG. 3, with front side back.

As depicted in FIGS. 5 and 6, the check valve 60 has the case 61 and a reed valve 63 accommodated in this case 61. Due to this reed valve 63, the interior of the case 61 is divided into an upstream chamber 61a and a downstream chamber 61b with respect to the flowing direction of the secondary air (indicated by arrow A in FIG. 5).

The upstream chamber 61a communicates with a control valve (not depicted) via a pipe 51, and further communicates with the atmosphere via an air cleaner (not depicted).

As indicated by a phantom line in FIG. 6, the downstream chamber 61b communicates with an exhaust port 21p of the engine via a communication path 64 and a cylinder head side communication path 25p (FIG. 7).

Thus, the secondary air is supplied to the exhaust port 21p and the exhaust path 21 of the engine via the air cleaner, the control valve, and the check valve 60.

In FIG. 6, symbols 26, 26 indicate intake valve shafts, symbols 27, 27 indicate exhaust valve shafts, symbol 28 indicates an ignition plug attachment hole, and symbol 28b indicates a drain hole thereof.

The above-described embodiment of the present invention should not be construed restrictively. The present invention allows modifications as appropriate without departing from the scope of the gist of the invention.

What is claimed is:

1. A saddle type vehicle having a water cooled engine, comprising: a thermostat provided in a cooling water path of the water cooled engine; and
   a check valve provided in a secondary air path supplying secondary air to an exhaust path of the water cooled engine,
   wherein a case of the thermostat and a case of the check valve are formed integrally,
   wherein the case of the thermostat is formed in a cylindrical configuration,
   wherein the case of the check valve is integrally connected to a cylindrical side wall of the case of the thermostat,
   wherein the check valve is a reed valve,
   wherein the water cooled engine is equipped with a crankcase arranged below, a cylinder extending upwardly from the crankcase, and an exhaust pipe which is connected to an exhaust outlet provided in front of the cylinder and which extends from the front of the cylinder toward a side of the cylinder so as to be curved as the exhaust pipe extends rearwards to form a curved portion, and
   wherein the thermostat and the check valve are fixed to the side portion of the cylinder above the crankcase, at the rear of the curved portion of the exhaust pipe, and on the inner side of the exhaust pipe.

2. The saddle type vehicle having a water cooled engine according to claim 1, wherein a through-hole for a fixation bolt is provided between the case of the thermostat and the case of the check valve, and
   wherein the thermostat and the check valve are fixed to the water cooled engine by the fixation bolt extending through the through-hole.

3. The saddle type vehicle having a water cooled engine, comprising: a thermostat provided in a cooling water path of the water cooled engine; and
   a check valve provided in a secondary air path supplying secondary air to an exhaust path of the water cooled engine,
   wherein a case of the thermostat and a case of the check valve are formed integrally,
   wherein the case of the thermostat is formed in a cylindrical configuration,
   wherein the case of the check valve is integrally connected to a cylindrical side wall of the case of the thermostat,
   wherein the check valve is a reed valve
   wherein a through-hole for a fixation bolt is provided between the case of the thermostat and the case of the check valve, and
   wherein the thermostat and the check valve are fixed to the water cooled engine by the fixation bolt extending through the through-hole
   wherein the water cooled engine is equipped with a crankcase arranged below, a cylinder extending upwardly from the crankcase, and an exhaust pipe which is connected to an exhaust outlet provided in front of the cylinder and which extends from the front of the cylinder toward a side of the cylinder so as to be curved as the exhaust pipe extends rearwards to faun a curved portion, and
   wherein the thermostat and the check valve are fixed to the side portion of the cylinder above the crankcase, at the rear of the curved portion of the exhaust pipe, and on the inner side of the exhaust pipe.

\* \* \* \* \*